(12) United States Patent
Jung et al.

(10) Patent No.: US 8,676,048 B2
(45) Date of Patent: Mar. 18, 2014

(54) SMALL-SIZED CAMERA MODULE FOR CORRECTING HAND-SHAKE

(75) Inventors: He Won Jung, Ansan-si (KR); Jong Sik Seo, Ansan-si (KR); Yo Sub Kim, Ansan-si (KR)

(73) Assignee: Hysonic. Co., Ltd. (KR)

(*) Notice: Subject to any disclaimer, the term of this patent is extended or adjusted under 35 U.S.C. 154(b) by 0 days.

(21) Appl. No.: 13/704,361

(22) PCT Filed: Jun. 16, 2011

(86) PCT No.: PCT/KR2011/004428
§ 371 (c)(1),
(2), (4) Date: Dec. 14, 2012

(87) PCT Pub. No.: WO2011/159117
PCT Pub. Date: Dec. 22, 2011

(65) Prior Publication Data
US 2013/0089311 A1    Apr. 11, 2013

(30) Foreign Application Priority Data
Jun. 16, 2010  (KR) ........................ 10-2010-0057189

(51) Int. Cl.
G03B 17/00    (2006.01)
G03B 3/10     (2006.01)

(52) U.S. Cl.
USPC ............................................ 396/55; 396/133

(58) Field of Classification Search
USPC ................... 396/55, 133; 359/554, 823, 824; 348/373–376
See application file for complete search history.

(56) References Cited

U.S. PATENT DOCUMENTS 8,238,736 B2 * 8/2012 Tsuruta et al. ................. 396/55

FOREIGN PATENT DOCUMENTS

| JP | 2004085819 | 3/2004 |
| JP | 2008154219 | 7/2008 |
| KR | 1020070101628 | 10/2007 |
| KR | 1020090127637 | 12/2009 |
| WO | WO/2009/133690 | * 5/2009 |

OTHER PUBLICATIONS

International Search Report—PCT/KR2011/004428 dated Dec. 28, 2011.

* cited by examiner

Primary Examiner — W B Perkey
Assistant Examiner — Minh Phan
(74) Attorney, Agent, or Firm — Cantor Colburn LLP

(57) ABSTRACT

The purpose of the present invention provides a small-sized camera module for correcting hand-shake, in which a magnet for correcting the shaking is integrated with a magnet for adjusting the focus to implement a simple structure. According to the present invention, the small-sized camera module for correcting hand-shake comprises: a housing; a holder which is mounted on the housing to move in a horizontal direction; a lens unit which is mounted inside the holder to move vertically, and has a lens therein; a first coil member which is wound on the outer surface of the lens unit; a second coil member which is mounted on either the holder or housing, and has a hollow form; and a magnetic member which is mounted on the remaining holder or housing, wherein the magnetic member comprises; a magnet which is inserted and arranged on the second coil member, and has polarities separated in left and right direction; and a yoke which is disposed on a lateral portion of the magnet, and encloses the lateral portion of the magnet and the upper/lower portions of the second coil member.

4 Claims, 11 Drawing Sheets

(a)

(b)

(a)

(b)

B-B

SMALL-SIZED CAMERA MODULE FOR CORRECTING HAND-SHAKE

TECHNICAL FIELD

The present invention relates to a small-sized camera module for correcting hand-shake, and particularly to a small-sized camera module for correcting hand-shake, which can adjust a focus of an object by moving a lens up and down using a coil and a magnet and also can correct the hand-shake by moving the lens horizontally.

BACKGROUND ART

FIG. 1 is a perspective view of a conventional compact camera, FIG. 2 is an exploded perspective view of the conventional compact camera, and FIG. 3 is an enlarged and exploded perspective view of an 'A' portion of FIG. 2.

Referring to FIGS. 1 to 3, the conventional compact camera generally includes a housing 10, a lens unit 20, a first coil 30, a first magnet 40 and an iron piece 50.

The lens unit 20 is installed in the housing to be movable horizontally.

The lens unit 20 in which a lens 60 is installed functions to adjust a focus of an object by moving the lens 60 in an optical axial direction of the lens 60.

Detailedly, the lens unit 20 includes a lens barrel 21 which covers the lens 60, a holder 22 in which the lens barrel 21 is inserted, a second magnet 23 which is installed inside the holder 22, and a second coil 24 which is disposed at an outer side of the lens barrel 21. The lens barrel 21 is moved in the optical axial direction of the lens 60 by an interaction between an electromagnetic field generated when electric power is applied to the second coil 24 and a magnetic field generated from the second magnet 23.

The first coil 30 is disposed at an outer side of the lens unit 20.

The first coil 30 is wound on the iron piece 50 in a rotational direction.

Further, the first magnet 40 is installed at an inner side surface of the housing so as to be adjacent to the first coil 30. The first magnet 40 is provided in plural so as to be contacted with upper and lower ends of the iron piece 50.

One end of the iron piece 50 is contacted with the first magnet 40 and the other end thereof is inserted into a center portion of the first coil 30 so as to be adjacent to the first coil 30.

By the above-mentioned configuration, electric power is applied to the first coil 30, and the lens unlit 20 is moved horizontally by an interaction between an electromagnetic field generated from the first coil 30 and a magnetic field generated from the first magnet 40, thereby correcting shaking of an object.

As described above, since the conventional compact camera includes the first magnet 40 for correcting the shaking and the second magnet 23 for adjusting the focus, the number of parts is increased, thereby providing a complicated structure and a large size.

DISCLOSURE

Technical Problem

An object of the present invention is to provide a small-sized camera module for correcting hand-shake, in which a magnet for correcting the shaking is integrally formed with a magnet for adjusting the focus, thereby providing a simple structure.

Technical Solution

To achieve the object of the present invention, the present invention can provide a small-sized camera module for correcting hand-shake, comprising a housing; a holder which is installed at the housing to be movable horizontally; a lens unit which is mounted in the holder to be movable up and down and has a lens therein; a first coil member which is wound on an outer surface of the lens unit; a second coil member which is installed at either the holder or housing and formed into a hollowed shape; and a magnetic member which is installed at the rest of the holder and the housing, wherein the magnetic member comprises a magnet which is disposed to be inserted into the second coil member and of which polarities are separated left and right; and a yoke which is disposed at a side portion of the magnet so as to wrap side, upper and lower portions of the second coil member and the magnet.

Preferably, the yoke is formed of a plate material, and a induction part is formed at upper and lower ends of the yoke so as to be protruded toward upper and lower sides of the second coil member, and the induction part is disposed to be spaced apart from upper and lower ends of the second coil member so that a line of magnetic force generated from the magnet and passing through the first coil member and the second coil member is induced again to the magnet.

Preferably, the second coil member is fixedly disposed at a side portion of the holder, and the yoke is fixedly disposed at a side portion of the housing, and one end of the magnet is disposed to be inserted into the second coil member and the other end thereof is installed at the yoke, and the lens unit is moved up and down by an interaction between a first electromagnetic field generated when electric power is applied to the first coil member and a first magnetic field generated from the magnet toward the first coil member, and the holder is moved horizontally by an interaction between a second electromagnetic field generated when electric power is applied to the second coil member and a second magnetic field generated from the magnet and induced up and down by the induction part.

Preferably, the second coil is fixedly disposed at the side portion of the housing, and one end of the magnet is passed through the second coil member and fixedly inserted into the holder, and the yoke is disposed at the side portion of the housing so as to be fixed to the other end of the magnet, and the lens unit is moved up and down by an interaction between a first electromagnetic field generated when electric power is applied to the first coil member and a first magnetic field generated from the magnet toward the first coil member, and the holder is moved horizontally by an interaction between a second electromagnetic field generated when electric power is applied to the second coil member and a second magnetic field generated from the magnet and induced up and down by the induction part.

Preferably, a lateral portion is formed at an outer circumferential surface of the lens unit so as to be parallel with the magnet.

Advantageous Effects

As described above, the small-sized camera module for correcting hand-shake of the present invention has effects, as follows:

Since one end of the magnet is disposed to be inserted into the second coil member and the polarities thereof are separated left and right and the yoke is disposed at the other end of the magnet so as to wrap the side, upper and lower portions of the second coil member and the magnet, the magnet for correcting the shaking and the magnet for adjusting the focus are formed integrally, thereby simplifying the structure of the camera module.

Since the induction part is disposed to be spaced apart from the upper and lower ends of the second coil member, the lines of magnetic force generated from the magnet and passed through the first coil member and the second coil member are induced again to the magnet, thereby facilitating the circulation of the lines of magnetic force, reducing loss of the lines of magnetic force and thus enhancing magnetic force of the magnet.

Since the lateral portion is formed to be parallel with the magnet, the distance between the first coil member wound on the lateral portion and the magnet is minimized, thereby enhancing the up and down driving force of the lens unit, which is generated by an interaction between the first electromagnetic field generated from the first coil member and the magnetic field generated from the magnet.

DESCRIPTION OF DRAWINGS

The above and other objects, features and advantages of the present invention will become apparent from the following description of preferred embodiments given in conjunction with the accompanying drawings, in which.

BEST MODE

Figure 1:
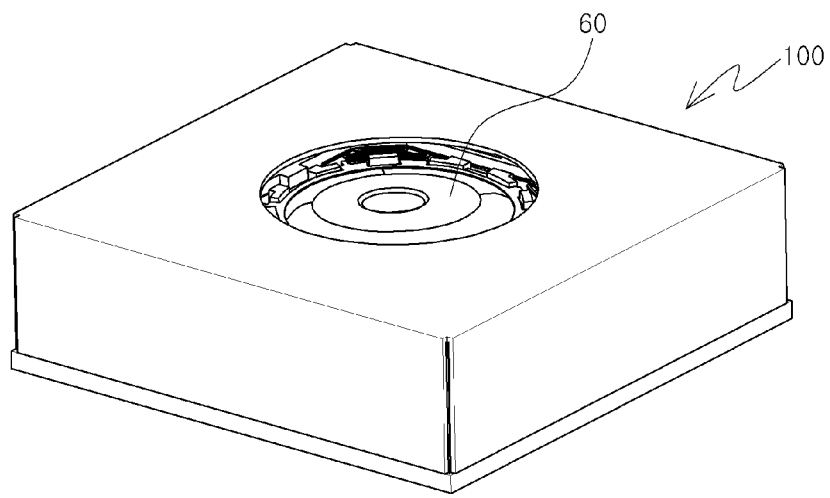
FIG. 1 is a perspective view of a conventional compact camera.
Figure 2:
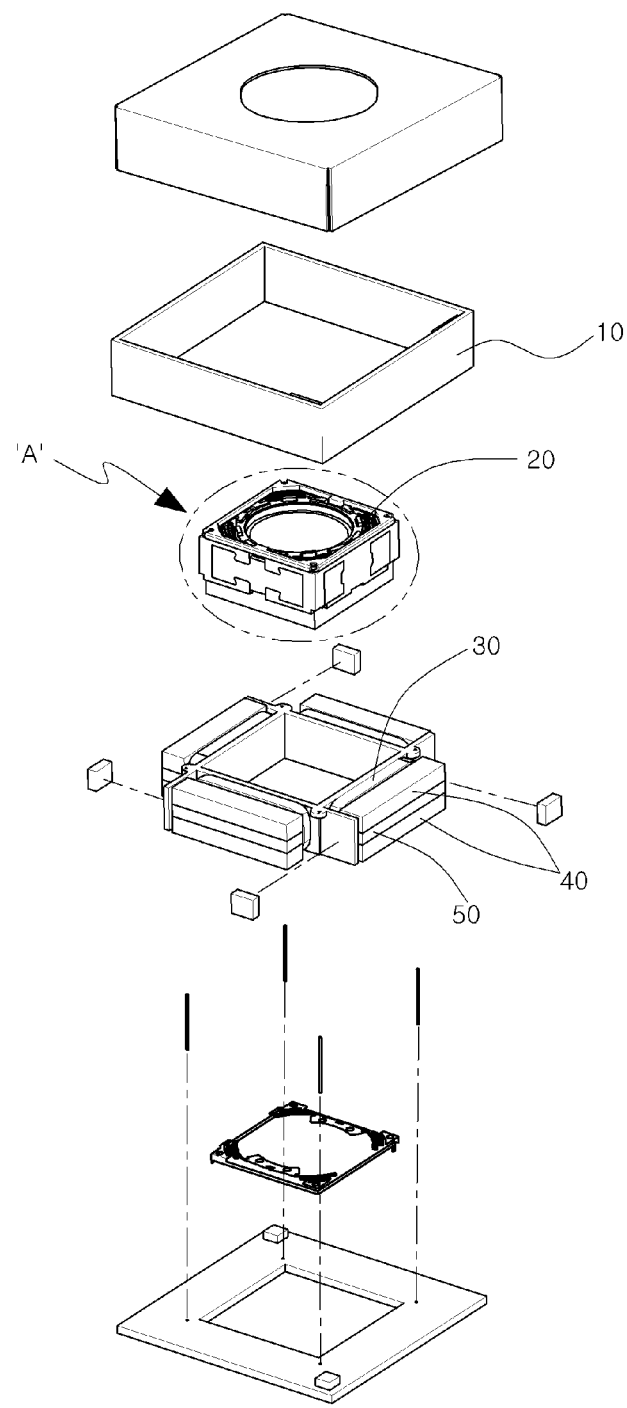
FIG. 2 is an exploded perspective view of the conventional compact camera.
Figure 3:
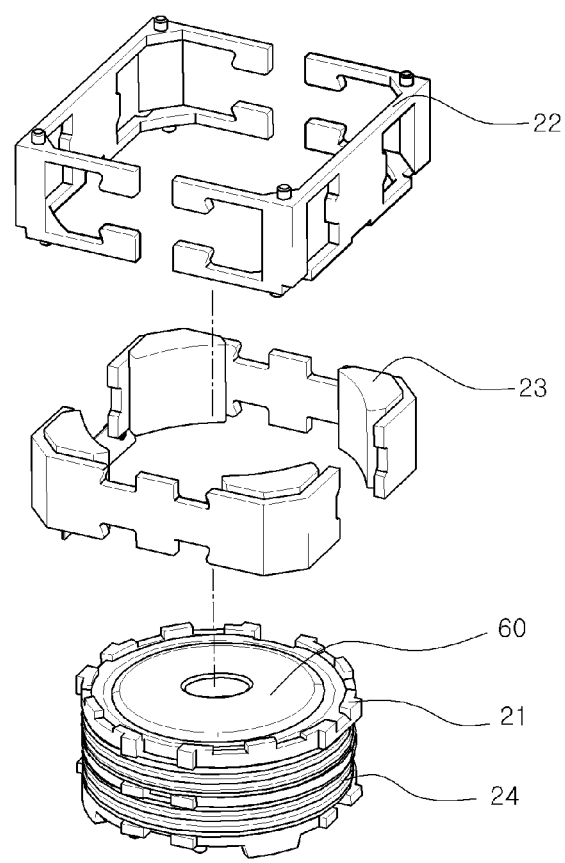
FIG. 3 is an enlarged and exploded perspective view of an 'A' portion of FIG. 2.
Figure 4:
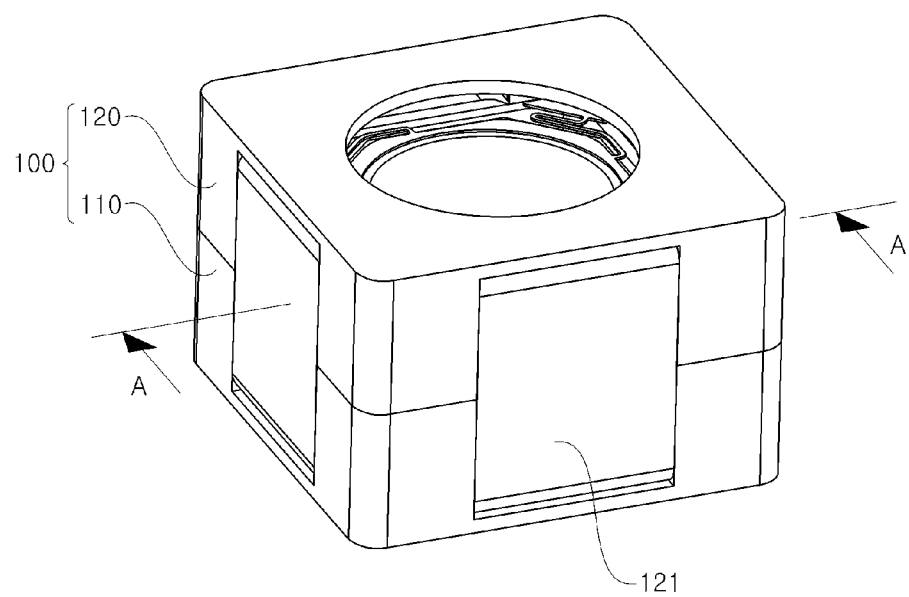
FIG. 4 is a perspective view of a small-sized camera module for correcting hand-shake according to an embodiment of the present invention.
Figure 5:
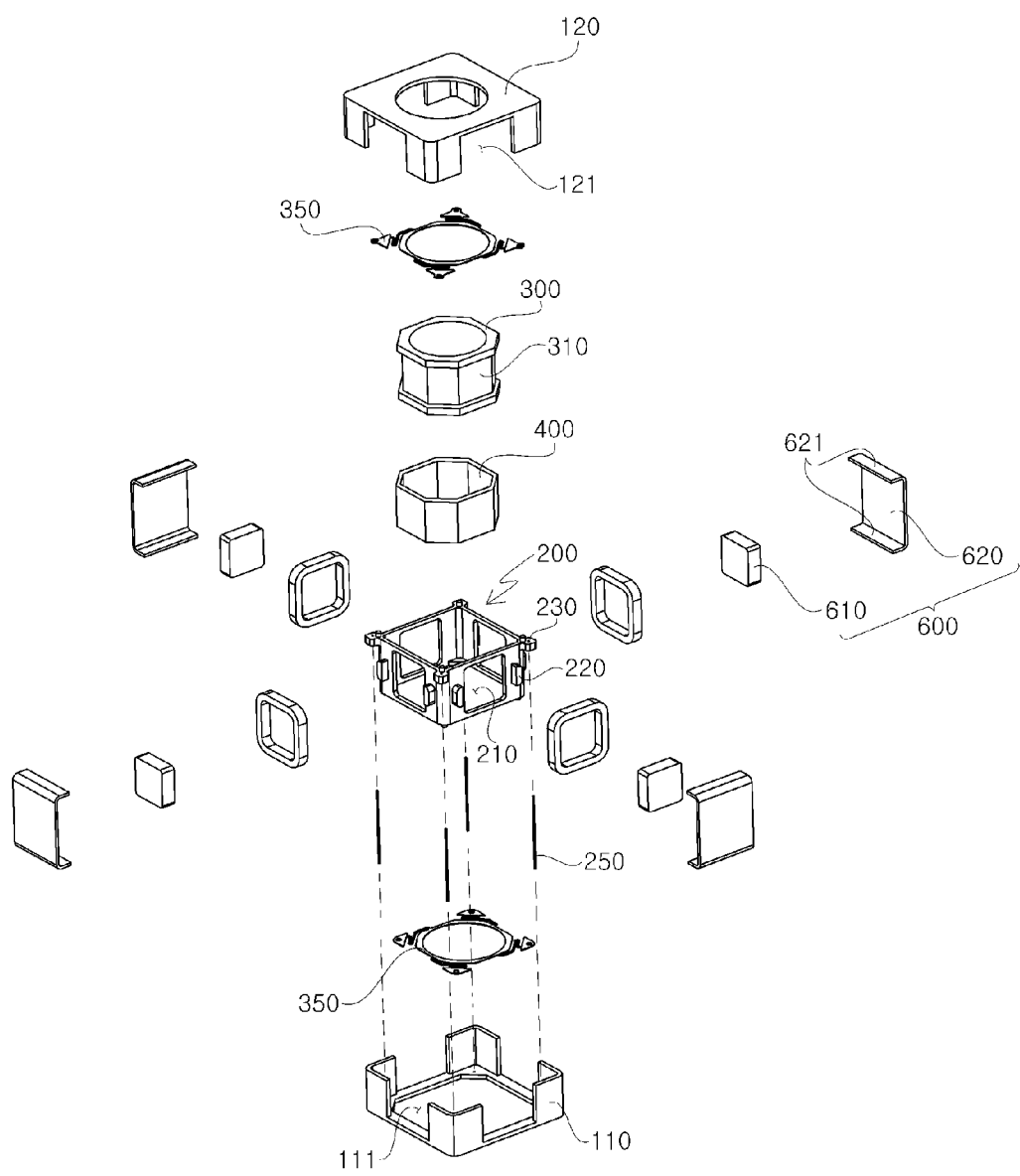
FIG. 5 is an exploded perspective view of the small-sized camera module for correcting hand-shake according to the embodiment of the present invention.

Hereinafter, the embodiments of the present invention will be described in detail with reference to accompanying drawings.

As shown in FIGS. 4 to 7, a small-sized camera module for correcting hand-shake according to an embodiment of the present invention includes a housing 100, a holder 200, a wire spring 250, a lens unit 300, a flat spring 350, a first coil member 400, a second coil member 500 and a magnetic member 600.

The housing 100 is formed into a hexahedral shape and comprised of a lower member 110 and an upper member 120.

The lower member 110 is formed into a hollowed rectangular shape of which upper and lower portions are opened and of which a side surface is formed with a first insertion groove 111.

The upper member 120 is formed into a hollowed rectangular shape of which upper and lower portions are opened and of which a side surface is formed with a second insertion groove 121.

The second insertion groove 121 is formed to be communicated with the first insertion groove 111. A yoke 620 of the magnetic member 600 is inserted into the first and second insertion grooves 111 and 121, as described later.

Further, the holder 200, the lens unit 300, the first coil member 400, the second coil member 500 and the magnetic member 600 are disposed between the lower and upper members 110 and 120.

The holder 200 is formed into a hexahedral shape of which upper and lower portions are opened and of which a side surface is formed with a rectangular through-hole 210. A supporting protrusion 220 is formed at both sides of the through-hole 210.

As described later, the through-hole 210 has a larger width than a magnet 610 of the magnetic member 600 so that a line of magnetic force generated from the magnet 610 toward the first coil member 400 can be formed facilely.

The supporting protrusion 220 is contacted with both ends of the second coil member 500 so that the second coil member 500 can be fixed well to the holder 200.

A connection part 230 at which the wire spring 250 is installed is formed near an upper vertex of the holder 200.

The wire spring 250 is formed to be long up and down and also elastically bent right and left.

An upper end of the wire spring 250 is installed at the connection part 230 and a lower end thereof is installed at the lower member 110 of the housing so as to elastically support the holder 200 in a horizontal direction when the holder 200 is moved horizontally.

The lens unit 300 is formed into an octagonal shape and formed with a through-hole in which a lens is installed.

Further, a lateral portion 310 is formed at an outer circumferential surface of the lens unit 300.

The lateral portion 310 is formed to be parallel with the magnet 610 and also formed at four places along the outer circumferential surface of the lens unit 300.

The first coil member 400 is installed at the outer circumferential surface of the lens unit 300, as described later.

Since the lateral portion 310 is formed to be parallel with the magnet 610, a distance between the first coil member 400 wound on the lateral portion 310 and the magnet 610 is minimized, thereby enhancing up and down driving force of the lens unit 300, which is generated by an interaction between a first electromagnetic field generated from the first coil member 400 and a magnetic field generated from the magnet 610.

Further, the lens unit 300 is installed inside of the holder 200 to be movable up and down, and also elastically supported up and down by the flat spring 350.

The flat spring 350 is formed into a square shape of which an outer side is installed at the holder 200 and an inner side is installed at the lens unit 300.

The flat spring 350 is disposed at each of upper and lower portions of the lens unit 300 so as to elastically support the lens unit 300 downwardly when the lens unit 300 is moved up, while the inner side of the flat spring 350 is relaxed upwardly.

The first coil member 400, as a wire through which a current is flowed, is wound along the outer circumferential surface of the lens unit 300 and arranged to wrap the lateral portion 310.

The second coil member 500, as a wire through which a current is flowed, is wound in the form of a hollowed rectangular shape, and an inner width of the second coil member 500 is the same as a width of the through-hole 210.

Four second coil members 500 are respectively disposed outside the holder 200.

Further, the second coil member 500 is fixedly disposed between the supporting protrusions 220 so as to be not moved right and left.

An inner width of the second coil member 500 formed to be larger than a width of the magnet 610.

Meanwhile, the magnetic member 600 is installed in the housing 100.

Detailedly, the magnetic member 600 includes the magnet 610 and the yoke 620.

The magnet 610 is formed into a square shape of which a width is formed to be the same as a width of the through-hole 210 and less than the inner width of the coil member 500.

One end of the magnet 610 is inserted into the second coil member 500 so as to be adjacent to the first coil member 400 and the other end thereof is inserted into the first and second insertion grooves 111 and 121 and fixed to the yoke 620.

Further, polarities of the magnet 610 are separated left and right.

That is, the polarities of the magnet 610 are separated into an N-pole part which is formed toward the holder 200 and an S-pole part which is formed toward the yoke 620.

Of course, if necessary, the N-pole part may be formed toward the yoke 620 and the S-pole part may be formed toward the holder 200.

Four magnets 610 are provided to be respectively inserted into the fourth second coil members 500.

The yoke 620 is formed of a magnetic plate, formed into a square shape and fixed to a side portion of the housing 100.

And the yoke 620 is fixedly inserted into the first and second insertion grooves 111 and 121. A width of the yoke 620 is formed to be the same as widths of the first and second grooves 111 and 121 and larger than the width of the magnet 610.

Further, an induction part 621 is formed at upper and lower ends of the yoke 620 to be protruded toward upper and lower portions of the second coil member 500.

That is, the induction part 621 is formed at the upper and lower ends of the yoke 620 to be bent at an angle of about 90° and then protruded toward the upper and lower sides of the second coil member 500.

Since the yoke 620 is formed of a plate material, the induction part 621 can be easily formed by using a press die The induction part 621 is formed into a rectangular shape and formed to be spaced apart from upper and lower ends of the second coil member 500 and also to be symmetric up and down.

A protruded width of the induction part 621 is formed to be same as a thickness of the magnet 610, and a width thereof is formed to be larger than a width of the magnet 610.

Since the induction part 621 is arranged to be spaced apart from the upper and lower ends of the second coil member 500, the lines of magnetic force generated from the magnet 610 and then penetrating the first and second coil members 400 and 500 are induced again to the magnet 610, thereby facilitating circulation of the lines of magnetic force generated from the magnet 610, reducing loss of the lines of magnetic force and enhancing magnetic force of the magnet 610.

Hereinafter, an operation state of the small-sized camera module for correcting hand-shake of the embodiment of the present invention will be described fully.

Figure 6:
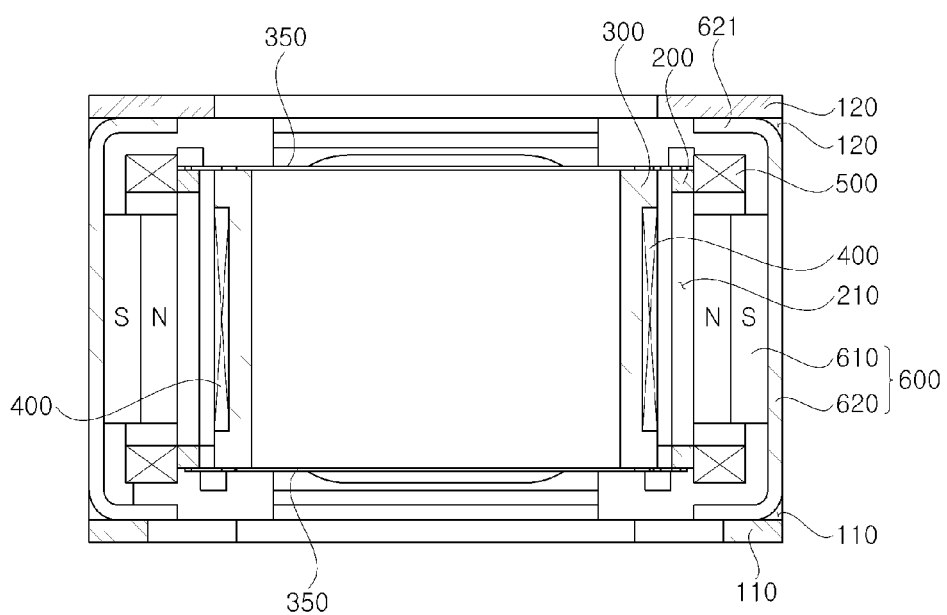
FIG. 6 is a cross-sectional view taken along a line A-A of FIG. 4.
Figure 7:
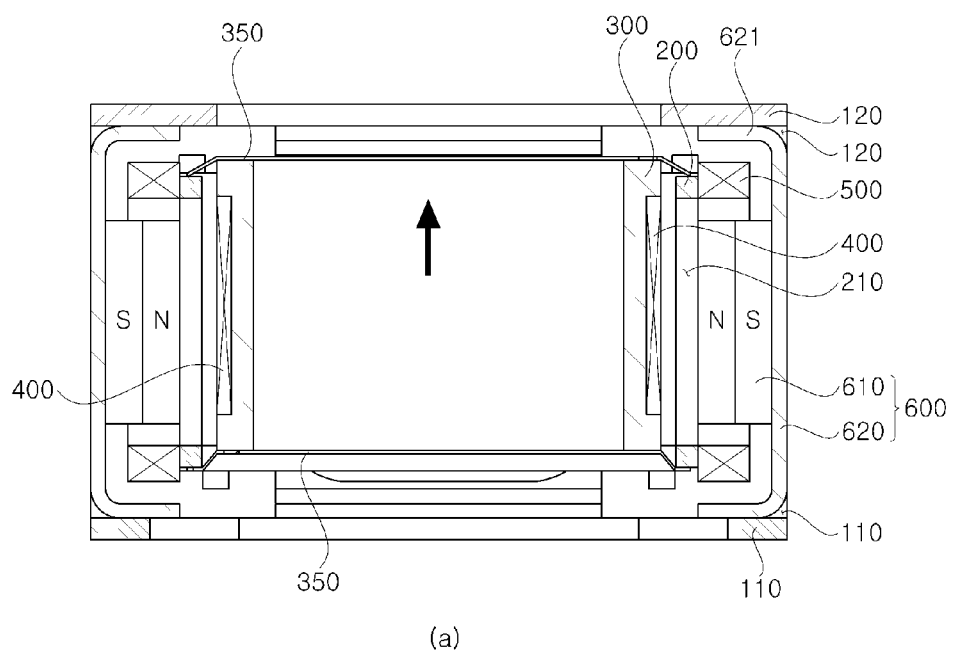
FIG. 7 is a view showing an operation state of the small-sized camera module for correcting hand-shake according to the embodiment of the present invention.
Figure 7:
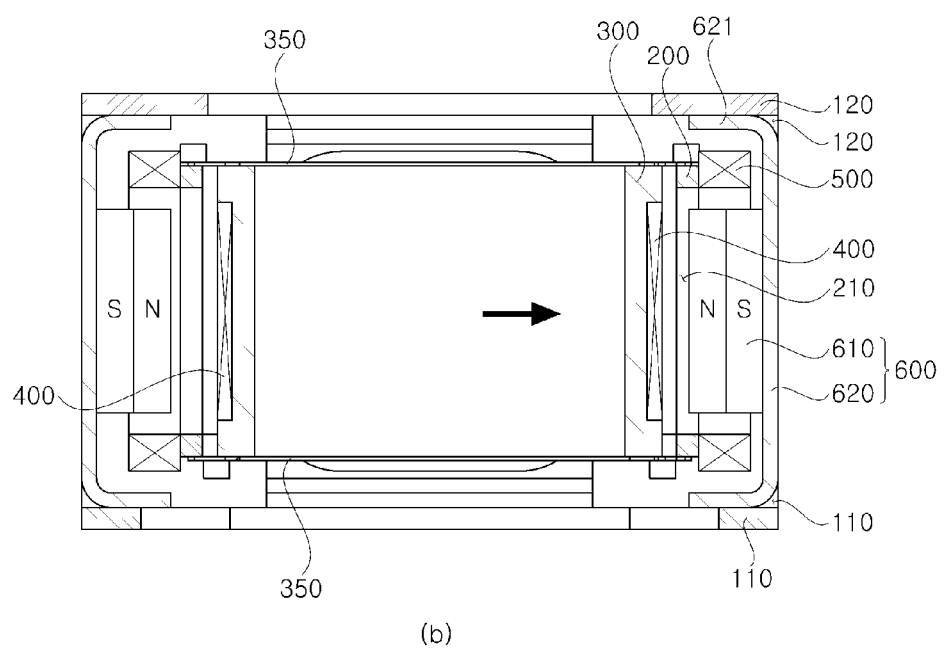

FIG. 6 shows an initial state of the small-sized camera module for correcting hand-shake of the embodiment of the present invention.

As shown in FIG. 6, the lens unit 300 is disposed in the holder 200, and two flat springs 350 for supporting the lens unit 300 are disposed to be parallel with each other.

And the holder 200 is disposed to be symmetric between the magnets 610.

That is, a center of the holder 200 is coaxial with a center between the magnets 610.

As shown in FIG. 7a, when electric power is applied to the first coil member 400, the lens unit 300 is moved up by an interaction between the first electromagnetic field generated from the first coil member 400 and the first magnetic field generated from the magnet 600 toward the coil member 400.

Figure 8:
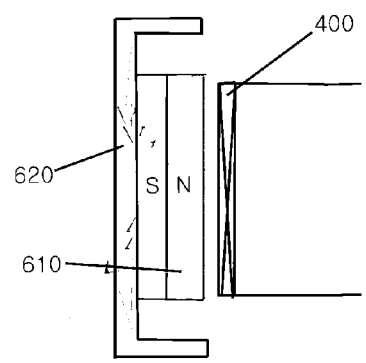
FIG. 8 is a view showing a line of magnetic force when operating the small-sized camera module for correcting hand-shake according to the embodiment of the present invention.
Figure 8:
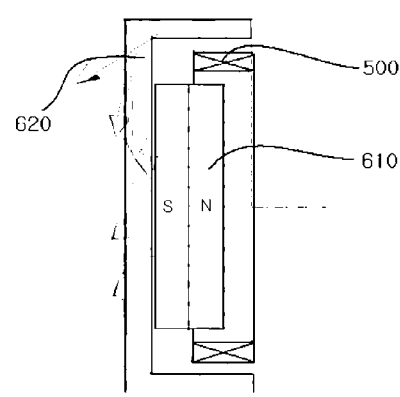

More detailedly, the whole magnetic field generated from the magnet 610 is flowed from the N-pole part to the S-pole part through the first coil member 400 and the yoke 620, as shown in FIG. 8a. The first magnetic field flowing from the N-pole part toward the first coil member 400, i.e., from the left side to the right side generates and applies the up and down driving force to the first coil member 400 while passing through the coil member 400.

And when the lens unit 300 is moved up, the inner portion of the flat spring 350 is relaxed, while moved up together with the lens unit 300, so as to elastically support the lens unit 300 downwardly.

Of course, if the electric power is applied to the first coil member 400 in the opposite direction, the first coil member 400 is moved down.

In the initial state, as shown in FIG. 7b, when the electric power is applied to the second coil member 500, the holder 200 is horizontally moved right by an interaction between a second electromagnetic field generated from the second coil member 500 and a second magnetic field generated from the magnet 610 and induced up and down by the induction part 621.

That is, as shown in FIG. 8c, among the whole magnetic field generated from the magnet 610, the second magnetic field flowing to the induction part 621 of the yoke 620 through the second coil member 500 generates and applies a left and right driving force to the second coil member 500.

Although not shown in FIG. 7b, while the holder 200 is moved right, an upper end of the wire spring 250 is also moved right and relaxed.

Of course, if the electric power is applied to the second coil member 500 in the opposite direction, the second coil member 500 is moved left.

As described above, one end of the magnet 610 is disposed to be inserted into the second coil member 500, and polarities thereof are separated left and right. The yoke 620 is disposed at the other end of the magnet 620 so as to wrap side, upper and lower portions of the second coil member 500 and the magnet 610. Thus, the magnet 610 for correcting the shaking and the magnet 610 for adjusting the focus are integrally formed, thereby simplifying the structure of the camera module.

Figure 9:
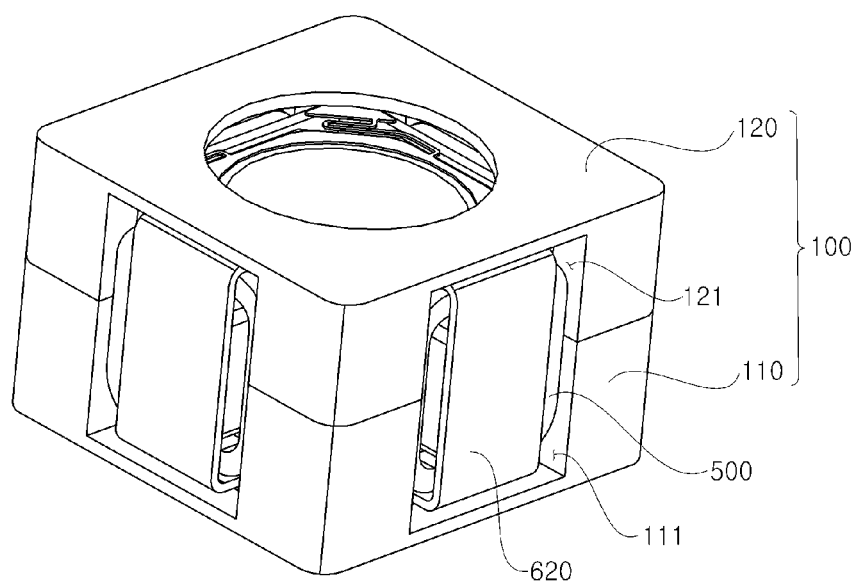
FIG. 9 is a perspective view of a small-sized camera module for correcting hand-shake according to another embodiment of the present invention.
Figure 10:
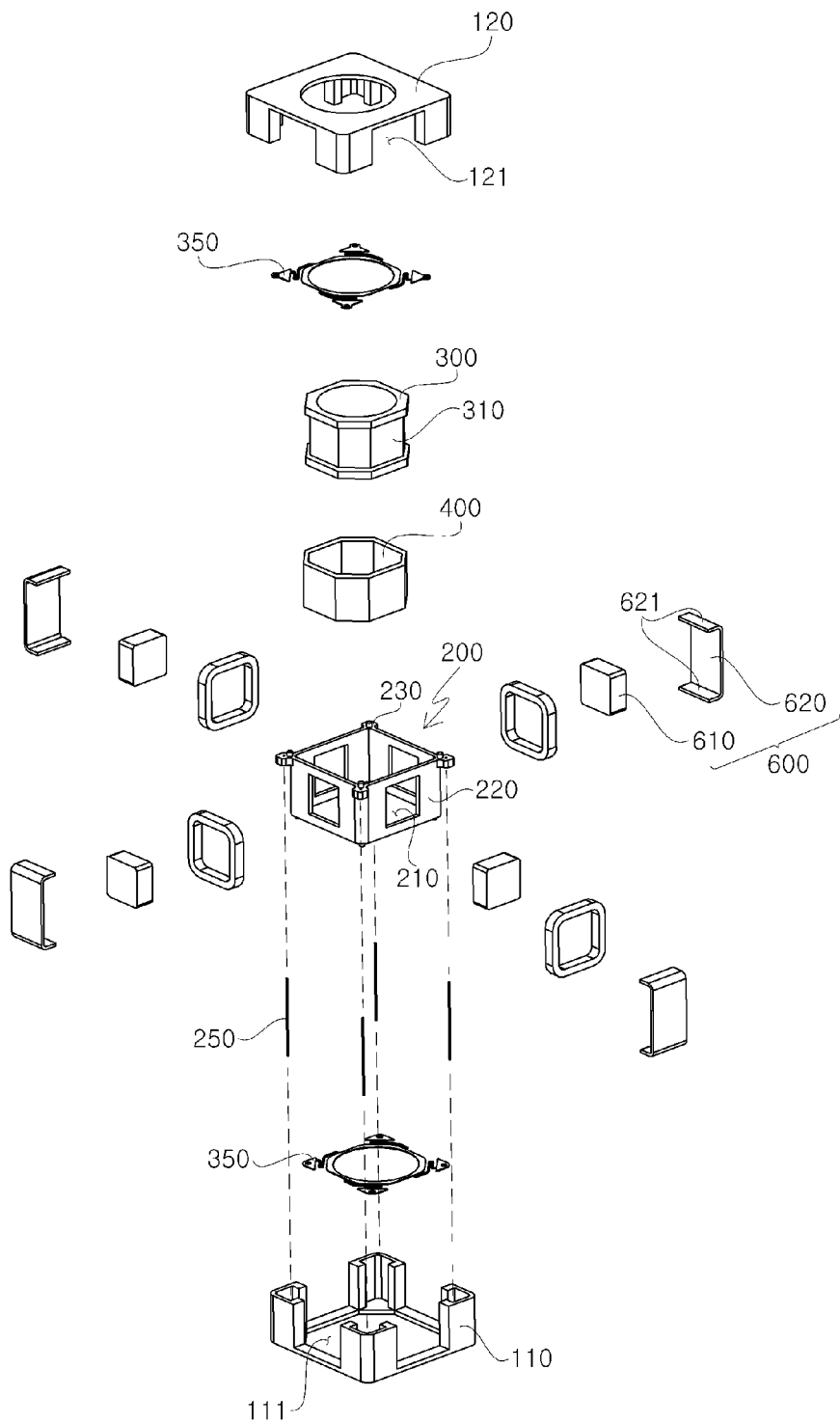
FIG. 10 is an exploded perspective view of the small-sized camera module for correcting hand-shake according to another embodiment of the present invention.
Figure 11:
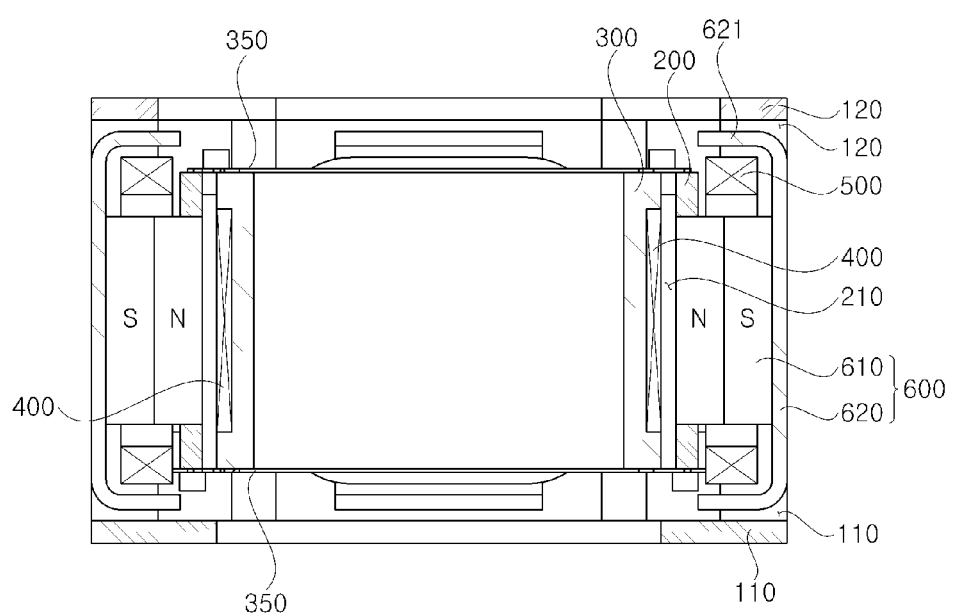
FIG. 11 is a cross-sectional view taken along a line B-B of FIG. 8.

Meanwhile, if necessary, as shown in FIGS. 9 to 11, the second coil member 500 may be installed at the housing 100, and the magnetic member 600 may be installed at the holder 200.

More detailedly, the second coil member 500 is fixed to a side portion of the housing 100.

One end of the magnet 610 is passed through the second coil member 500 and fixedly inserted into the holder 200, and the other end thereof is disposed at the side portion of the housing 100.

The yoke 620 is disposed at the side portion of the housing 100 so as to be movable horizontally and fixed to the other end of the magnet 610.

In this case, the holder 200 is moved horizontally together with the magnet 610 and the yoke 620 by an interaction between the second electromagnetic field generated when electric power is applied to the second coil member 500 and the second magnetic field generated from the magnet 610 and induced up and down by the induction part 621.

INDUSTRIAL APPLICABILITY

As described above, the present invention can be applied to a compact camera like a camera in a mobile terminal, thereby preventing the hand-shake, and particularly simplifying the structure by integrating the magnet for correcting the shaking and the magnet for adjusting the focus.

While the present invention has been described with respect to the specific embodiments, it will be apparent to those skilled in the art that various changes and modifications may be made without departing from the spirit and scope of the invention as defined in the following claims.

The invention claimed is:

1. A small-sized camera module for correcting hand-shake, comprising:
 a housing;
 a holder which is installed at the housing to be movable horizontally;
 a lens unit which is mounted in the holder to be movable up and down and has a lens therein;
 a first coil member which is wound on an outer surface of the lens unit;
 a second coil member which is installed at either the holder or housing and formed into a hollowed shape; and
 a magnetic member which is installed at the rest of the holder and the housing, wherein the magnetic member comprises a magnet which is disposed to be inserted into the second coil member and of which polarities are separated left and right; and a yoke which is disposed at a side portion of the magnet so as to wrap side, upper and lower portions of the second coil member and the magnet,
 wherein the yoke is formed of a plate material, and an induction part is formed at upper and lower ends of the yoke so as to be protruded toward upper and lower sides of the second coil member, and the induction part is disposed to be spaced apart from upper and lower ends of the second coil member so that a line of magnetic force generated from the magnet and passing through the first coil member and the second coil member is induced again to the magnet.

2. The small-sized camera module according to claim 1, wherein the second coil member is fixedly disposed at a side portion of the holder, and the yoke is fixedly disposed at a side portion of the housing, and one end of the magnet is disposed to be inserted into the second coil member and the other end thereof is installed at the yoke, and the lens unit is moved up and down by an interaction between a first electromagnetic field generated when electric power is applied to the first coil member and a first magnetic field generated from the magnet toward the first coil member, and the holder is moved horizontally by an interaction between a second electromagnetic field generated when electric power is applied to the second coil member and a second magnetic field generated from the magnet and induced up and down by the induction part.

3. The small-sized camera module according to claim 1, wherein the second coil member is fixedly disposed at the side portion of the housing, and one end of the magnet is passed through the second coil member and fixedly inserted into the holder, and the yoke is disposed at the side portion of the housing so as to be fixed to the other end of the magnet, and the lens unit is moved up and down by an interaction between a first electromagnetic field generated when electric power is applied to the first coil member and a first magnetic field generated from the magnet toward the first coil member, and the holder is moved horizontally by an interaction between a second electromagnetic field generated when electric power is applied to the second coil member and a second magnetic field generated from the magnet and induced up and down by the induction part.

4. The small-sized camera module according to claim 1, wherein a lateral portion is formed at an outer circumferential surface of the lens unit so as to be parallel with the magnet.

* * * * *